J. B. CRAIG.
POLICE NIPPERS.

No. 250,208. Patented Nov. 29, 1881.

WITNESSES
A. Moore
J. E. Carpenter

John B Craig  INVENTOR
by J W Craig
ATTORNEY.

UNITED STATES PATENT OFFICE.

JOHN B. CRAIG, OF ST. LOUIS, MISSOURI.

POLICE-NIPPERS.

SPECIFICATION forming part of Letters Patent No. 250,208, dated November 29, 1881.

Application filed July 11, 1879.

*To all whom it may concern:*

Be it known that I, JOHN B. CRAIG, of the city and county of St. Louis, and State of Missouri, have invented a new and useful Improvement in Police-Nippers; and I do hereby declare that the following is a full, clear, and exact description of the same.

My invention is an improvement in the class of police-nippers which are employed for seizing and holding the wrists or arms of prisoners, and the curved jaws of which are so connected that the movement of one of them in opening or closing it will cause a like movement of the other.

The jaws of my improved nippers are S-shaped, or constructed with reversed curves, and I connect the upper ends of the same by means of toggle-levers, which serve to open and close the jaws and to hold them closed when in a certain position.

Figure 2:
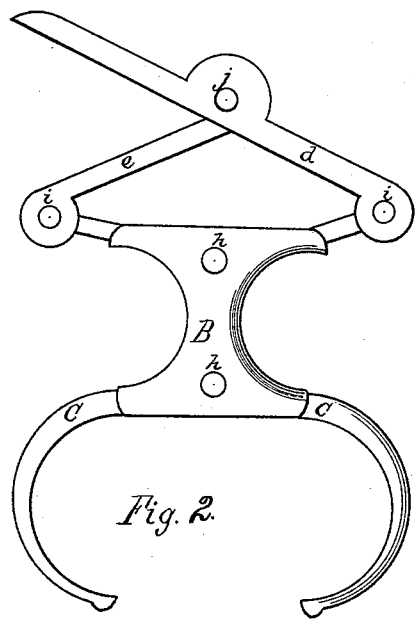
Figure 3:
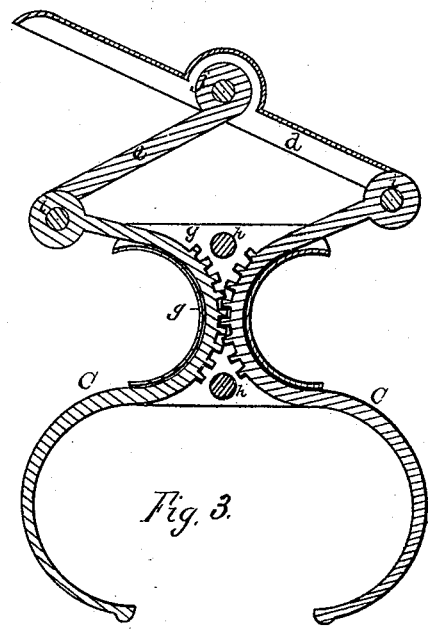
Figure 4:
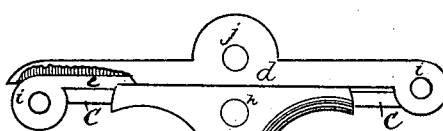
Figure 4:
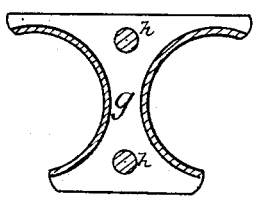
Figure 1:
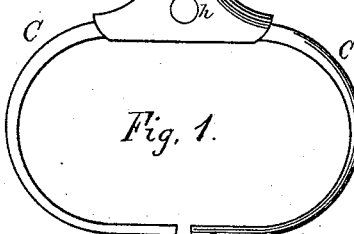
Figure 5:
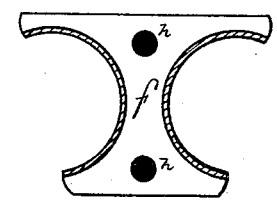

In accompanying drawings, Figure 1 is a side view of the nippers closed, and Fig. 2 a similar view of the nippers open. Fig. 3 is a section of the same open. Figs. 4 and 5 are sectional views of the parts of the frame or fixed portion of the device.

The jaws C C of the nippers are each S-shaped or curved reversely, so that their ends point in opposite directions. The jaws are provided with teeth on their inner convex curves, and are placed in a metal box, B, which is formed of two like flanged parts, *f g*, secured together by transverse bolts or rivets *h h*. The box B is flared or funnel-shaped at each end, corresponding or conforming to the curves of the jaws. The teeth of the jaws C C mesh and are held engaged, as shown in Fig. 3, and hence the sliding movement of one will impart a like movement to the other, so that both will open and close together. It is obvious that in such movement the jaws follow the curve of the sides of the box B, and that the sliding movement is effected when the upper ends of the jaws are separated more widely or brought nearer each other, as the case may be. The means I employ for sliding and thus opening and closing the jaws C consist of the grooved lever *d* and shorter link or bar *e*, which are pivoted together at *j* and to the ends *i i* of the respective jaws C C. The bar *e* is pivoted to the lever *d* at the middle of the latter, and when the two are folded, as shown in Fig. 1, the bar *e* lies in the groove of lever *d*, and their connecting-pivot *j* is above a right line drawn through the pivots *i i*, so that the jaws cannot be opened until the lever *d* is raised, when the upper ends, *i*, of the jaws C will be drawn toward each other, thereby causing the jaws to slide through the box B and open to a corresponding extent.

In practice the officer using the nippers, having once closed the jaws on a prisoner's wrist or other part of the arm, will retain his grasp on the cross-handle formed by the lever *d*, link *e*, and head of box B, as shown in Fig. 1, and the said lever will thus be held closed, so that it will be impossible to open the jaws until the lever is released and raised, as shown in Fig. 2.

I am aware that the jaws of police-nippers have been pivoted and provided with meshing teeth, and that such jaws have been operated and held closed by a lever attachment.

What I claim is—

The combination, with the toothed sliding jaws C C, having reversed curves, and the box having lateral projections, of the lever *d*, having a groove in its under side, and the link *e*, pivoted to said lever at a point which, when the lever is closed, is above a right line drawn between the pivots *i i*, so that the jaws may be held locked, as specified.

JOHN BENTON CRAIG.

Witnesses:
M. CURTS,
JOHN HADNIF.